United States Patent [19]

Huntt

[11] 3,789,505

[45] Feb. 5, 1974

[54] METHOD OF MAKING A MULTI-CORE MAGNETIC HEAD WITH A NON-MAGNETIC HOLDER

[76] Inventor: Robert L. Huntt, 25007 Woodfield Rd., Damascus, Md. 20750

[22] Filed: Feb. 11, 1972

[21] Appl. No.: 225,571

[52] U.S. Cl. ............... 29/603, 29/424, 179/100.2 C
[51] Int. Cl. ............................................. G11b 5/42
[58] Field of Search........ 29/603, 424; 179/100.2 C; 340/174.1 F; 346/74 MC

[56] References Cited

UNITED STATES PATENTS

| | | | |
|---|---|---|---|
| 3,466,637 | 9/1969 | Hagadorn | 29/603 X |
| 3,064,333 | 11/1962 | Kristiansen et al. | 29/603 |
| 3,404,242 | 10/1968 | Girdner | 29/603 X |
| 3,478,340 | 11/1969 | Schwartz et al. | 29/603 X |
| 3,502,821 | 3/1970 | Duinker | 29/603 X |
| 3,668,775 | 6/1972 | Morita et al. | 29/603 |

*Primary Examiner*—Charles W. Lanham
*Assistant Examiner*—Carl E. Hall
*Attorney, Agent, or Firm*—John W. Malley et al.

[57] ABSTRACT

A method of making a multi-core magnetic head whereby a plurality of slots are produced in the base portion of a U-shaped block of non-magnetic ceramic material, such as Zinc Ferrite. Pieces of magnetic ceramic material, such as Nickel Ferrite, which have been ground to the appropriate shape are each slipped into the slot and bonded therein, for example, by glass bonding, so as to extend into the region bounded by the legs of the block of non-magnetic ceramic material. This region is then filled with a potting material which lends mechanical strength. The pieces and block are then cut in half along a line which passes through each piece and the surface thus formed on each half gound, lapped and polished to profile the desired pole piece dimensions. If desired the base of the block can then be grooved and shields placed in the grooves to reduce cross-talk. Spacing material is then deposited, for example, Titantium by vacuum deposition, on the non-magnetic block to set the gap thickness. The two ground halves are then bonded together and potted to form the multi-core head.

10 Claims, 9 Drawing Figures

METHOD OF MAKING A MULTI-CORE MAGNETIC HEAD WITH A NON-MAGNETIC HOLDER

BRIEF DESCRIPTION OF THE PRIOR ART AND SUMMARY OF THE INVENTION

The invention relates to a method of manufacturing a ceramic multi-core magnetic transducer having a non-magnetic holder.

A number of difficult problems have heretofore prevented manufacturers from making reproducible recording heads from ceramic and other similar materials. One of these problems is an inability to achieve uniformity from one pole piece to another within the head. A further problem is an inability to eliminate or reduce machining stresses. Most manufacturers consider a five to one rejection rate, i.e. five heads made for one acceptable head, to be satisfactory.

Many attempts have been made in the past to reduce this reject rate. One technique which has been tried involves use of an epoxy potting material in which the individually cut magnetic heads are placed so that the epoxy provides mechanical strength during grinding, polishing and cutting. The patent to Hagadorn, U.S. Pat. No. 3,466,637, describes one such method, and the patent to Schwartz et al, U.S. Pat. No. 3,478,340, shows another similar technique in which layers of non-magnetic material are disposed between layers of magnetic material to isolate adjacent heads.

The present invention relates to a method of producing a ceramic multi-core magnetic head with a lower reject rate than in the past and resolving, at least substantially, the problems described above. According to the novel method of this application, a block of hot-pressed ferrite ceramic or other magnetic material is machined and cut to form a plurality of magnetic pieces of any suitable shape. A holder of non-magnetic material, preferably in the form of a U-shaped block, is also machined to form a plurality of slots into which the individual pieces are bonded by any suitable method, such as glass bonding so as to extend into the region bounded by the legs of the block. The magnetic head and the non-magnetic holder preferably are of similar mechanical characteristics, for example, Zinc Ferrite and Nickel Ferrite for the non-magnetic holder and the magnetic head material, respectively.

Next, the region into which the magnetic pieces extend from the slots inthe non-magnetic holder is potted with a suitable epoxy or other similar material for adding mechanical strength during cutting and polishing the material. The non-magnetic holder and the magnetic pieces bonded to it are then cut into halves along a line passing through each of the pieces. The internal shape of the head is ground out on each half to form the two pole pieces and the potting material thereafter eliminated. If desired, the two halves of the holder can be grooved to accept shields which are then bonded in place between adjacent pole pieces to reduce cross-talk. The gap between the pole pieces is next set, preferably by vacuum depositing titanium or other material on the non-magnetic material adjacent the pole pieces. The two halves can now be bonded together to form a multi-core head.

Wire coils are next dropped onto the upwardly extending pole legs and conventional back bars are bonded on the ends of the legs to complete the magnetic circuits. The entire composite is then preferably potted in a suitable material, and the front section of the head ground, lapped and polished to a desired profile, exposing the pole pieces and the shields.

Many other objects and purposes of the invention will become clear from the following detailed description of the drawings.

DETAILED DESCRIPTION OF THE DRAWINGS

Figure 1:
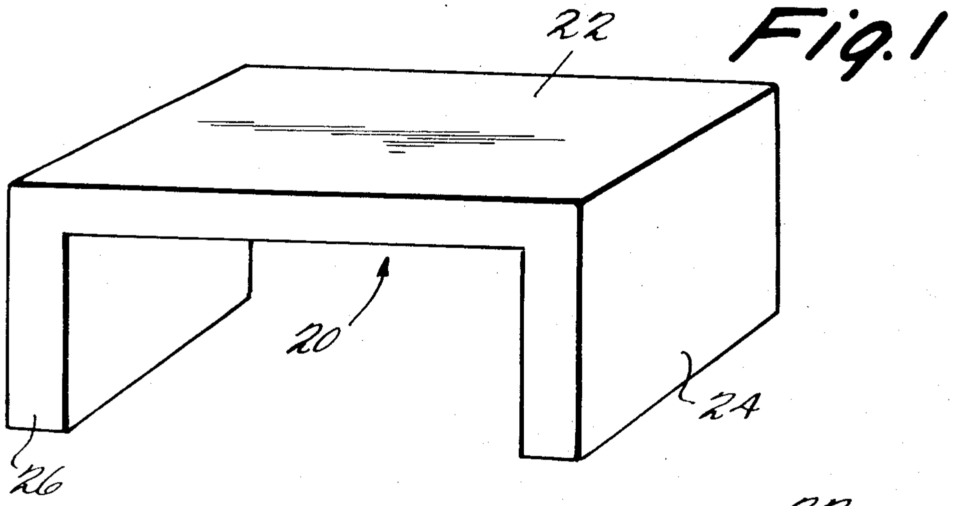
FIG. 1 shows a perspective view of the block of non-magnetic material which forms the holder.
Figure 2:
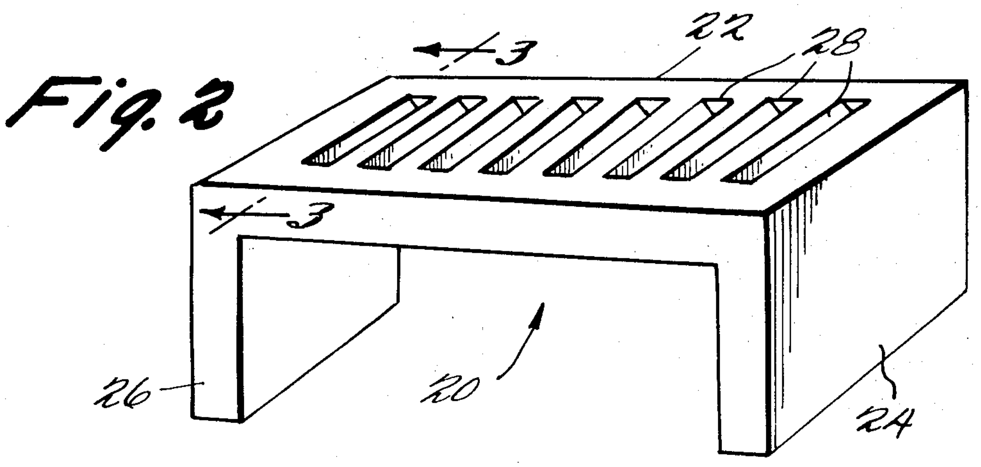
FIG. 2 shows a perspective view of the block of FIG. 1 after it has been slotted.

Reference is now made to FIG. 1 which shows a U-shaped block of material 20 having a base portion 22 and legs 24 and 26 extending upward from base portion 22. Material 20 may be of any suitable non-magnetic, ceramic material and preferably matches as closely as possible the mechanical characteristics of the magnetic material to which it is bonded and which forms the pole pieces. Hot pressed Zinc Ferrite is preferred, and it is believed that alumina and MgTi can also be used satisfactorily. The block of material 20 is then machined, either as two parts or one, to form a plurality of parallel slots 28 extending through base portion 22 as can also be seen in FIG. 3. The shape of slots 28 matches the shape of the magnetic pieces which are bonded to each slot as described below.

Figures 3, 4:
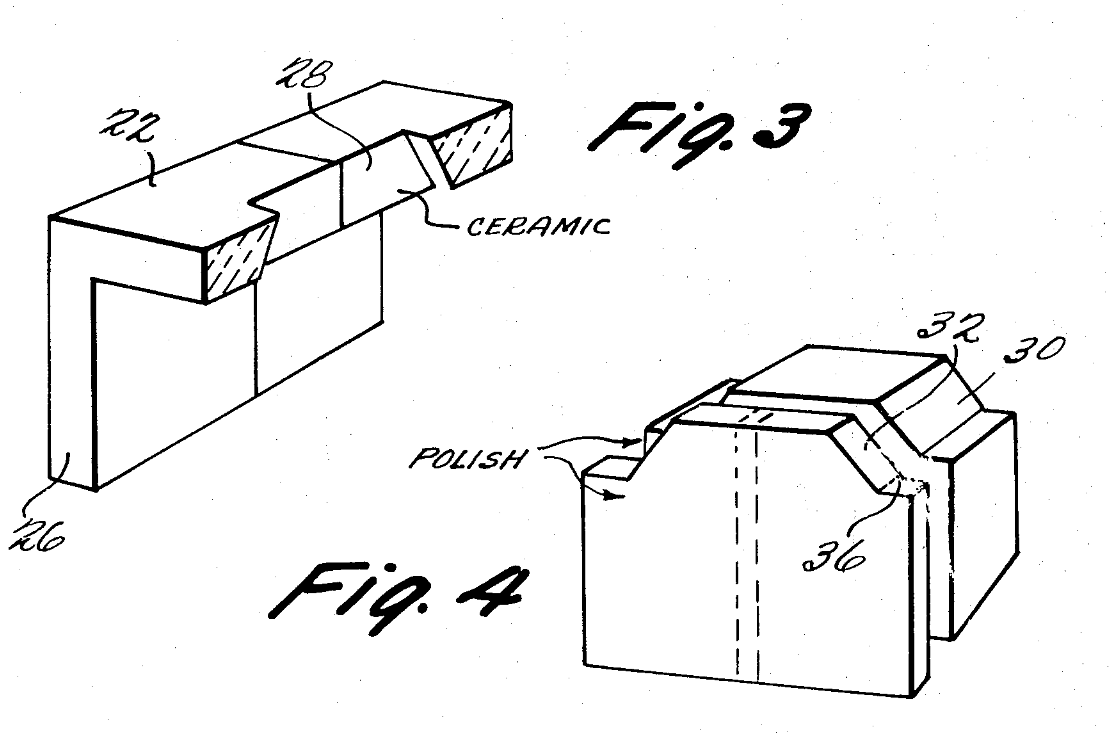
FIG. 3 shows a perspective cut-away view of the block illustrated in FIG. 2 along the lines 3—3.
FIG. 4 illustrates a perspective view of the magnetic material which forms the pole pieces in the assembled head after it has been cut and polished to the desired shape and with one of the heads cut from the block.

Reference is now made to FIG. 4 which shows a perspective view of a block of magnetic ceramic, preferably ferrite, material 30. This magnetic material can be conventionally fired, but it is preferably a hot pressed type of ceramic and Nickel Ferrite has been found to be quite satisfactory, particularly in combination with Zinc Ferrite for the non-magnetic holder material. In particular, constructing both the non-magnetic holder and the magnetic pole pieces from ferrite material should considerably extend the wear characteristics of the completed transducer over that of a conventional metal head. Ferrites generally extend the life of a recording head at least five times compared to conventional magnetic heads. By constructing both the holder and the pole pieces of material having similar mechanical characteristics, the wear piece of the composite structure should be considerably enhanced.

The block of material 30 is first ground to whatever shape is desired for the pole pieces leaving excess material in the center for a saw cut as described in detail below. The configuration is ground in long lengths to whatever tolerance is required.

The geometry of the heads can be virtually any shape which is desired including triangular, square, pentagonal, circular, or virtually any other shape. However, the particular shape which is shown in FIG. 4 has been found to be effective. The steep angle which is provided by surface 32, as shown in FIG. 4, in the approach to the gap allows minimum exposure of magnetic material to the tape. The step formed by surface 36 is useful in locating the head for machining. Other magnetic heads in the past have used surfaces forming steep angles, and the patent to Went et al., U.S. Pat. No. 2,854,524, shows one such head.

Figures 5, 6, 7, 8:
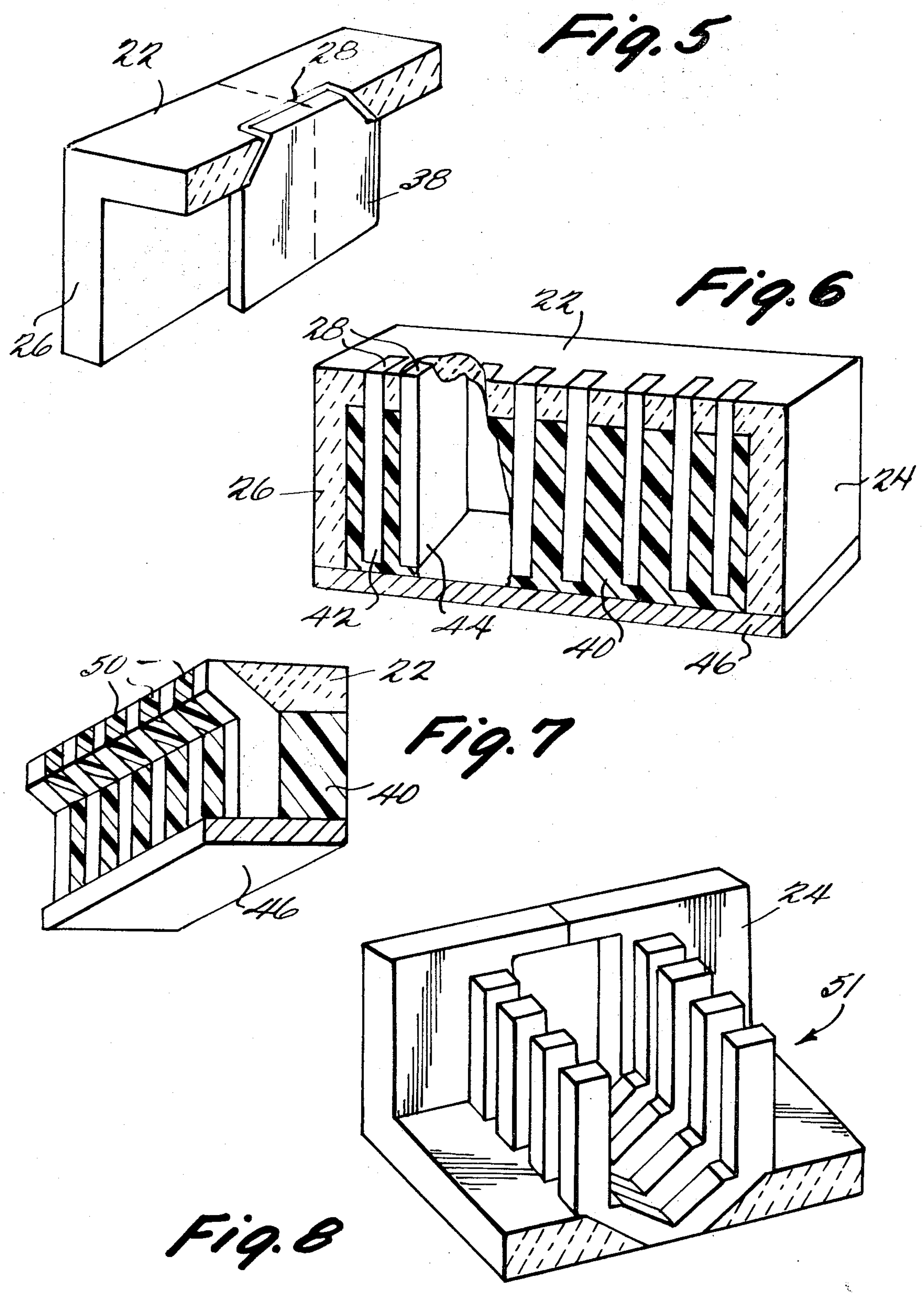
FIG. 5 shows a perspective cut-away view of the block of non-magnetic material with one of the magnetic pieces from the magnetic block of FIG. 4 in place in one of the slots in the non-magnetic holder.
FIG. 6 shows a perspective view of the non-magnetic holder with a plurality of magnetic pieces bonded in the slots therein after the holder and pieces have been cut along the line indicated in FIG. 5 and with potting material added to fill the space between adjacent pieces of magnetic material.
FIG. 7 illustrates a perspective view of the structure of FIG. 6 after the front surface thereof has been ground, lapped and polished to the desired shape to form the pole pieces.
FIG. 8 illustrates a cut-away perspective view showing two of the machined structures of FIG. 7 bonded together and with the potting and scrap material removed to form a multi-core head with upwardly extending legs.

Pieces of magnetic material are sliced from the block 30 as shown in FIG. 4 and polished on both sides to provide a good edge definition. A piece is then placed in each of the slots 28 of non-magnetic holder 20. FIG. 5 FIG. 5 shows a perspective cut-away view with one piece 38 of magnetic material placed in a slot 28 on the base surface 22 of the block of non-magnetic material 20. The reference step is now referenced to the bottom edge of the base portion 22 of non-magnetic holder 20 where it can serve as a reference surface throughout the grinding process. As can be seen in FIG. 5, the legs 24 and 26 of magnetic holder 20 extend beyond the pieces 38. The pieces 38 can be held in slots 28 by jigs if necessary, but if the tolerance on the slot is close enough, no jigging will probably be required.

Before potting, the pieces of magnetic material which form the pole pieces, such as piece 38, are preferably bonded to the non-magnetic material in the slots 28 by any suitable fashion. Glass bonding is expected to be especially stisfactory but other bonding techniques including the use of enamel epoxies, glue, etc. can be employed. If glass bonding is used, it is desirable that the pole pieces, non-magnetic material and glass or glasses have, within 5 percent, the same thermal expansion coefficients, the glasses available for bonding have a wide range of thermal expansion coefficients. Such bonding techniques are well known in the art.

To facilitate grinding and lapping, the region bounded by legs 24 and 26 is next potted with a conventional and suitable epoxy material 40. Potting material 40 provides mechanical strength to the composite structure to prevent breakage of the magnetic material under the the stress of grinding.

Block 20 of non-magnetic material with the pieces of magnetic material, such as piece 38, bonded to the portions of block 20 bounding slots 28, is now cut into along the slice line which is shown in FIG. 5. halves two hlaves are later recombined after the magnetic pole pieces have been ground to the appropriate shape as described below. FIG. 6 illustrates a perspective view of one of these cut-away portions showing the epoxy material 40 which is added between the magnetic pieces to lend strength during cutting and machining. For clarity in illustration, only two magnetic pieces 42 and 44 are shown in FIG. 6 but it will, of course, be understood that any number of pieces can be employed. A scrap piece of ceramic material 46 is also placed on top of the ends of the magnetic pieces between legs 24 and 26 to close the core. Since the non-magnetic material is the basis for gap definition, all surfacing is lapped square. Piece 46 facilitates faster lapping and polishing.

Each of the two halves which were formed by slicing block 20 and the magnetic pieces disposed in the slots 28 thereof are then lapped square and ground to whatever shape is desired for the pole pieces. In FIG. 7, the front surface of the structure which is shown in FIG. 5 has been ground and polished to produce a plurality of pole pieces of the shape illustrated with the pole pieces being separated by potting material 40. From the edge of the non-magnetic material, the gap depth can be set without difficulty, and this gap will be uniform from one pole piece to another since the pole pieces are held within potting material 40 and within the holder 20. Legs 24 and 26 of the magnetic holder 20 which cannot be seen in FIG. 7 are likewise ground to the same shape. The depth of cut on the magnetic and support material define the amount of exposure of the magnetic material. The upper and lower surfaces of the base portion 22 of holder 20 and the scrap piece 22 are next lapped and polished.

After lapping and polishing, the potted material is removed from both halves by any conventional technique leaving the individual pole pieces set in the non-ceramic holder 20. One of the two halves is now ready to receive a deposit of material on the non-magnetic parts 50 of holder 20 adjacent the magnetic pole pieces to define the gap thickness as can be seen in FIG. 7. One technique which has been found to be particularly satisfactory is to vacuum deposit a film of titanium of desired thickness. This deposition, of course, takes place only on the non-magnetic material.

The two halves are now fitted together to form a composite head 51 which is illustrated in a cut-away perspective in FIG. 8 with the pole piece legs extending upward from the base portion 22 of the non-magnetic holder. It will be appreciated that any suitable number of pole pieces can be used and that leg 26 as well as leg 24 is present in the completed material.

Figure 9:
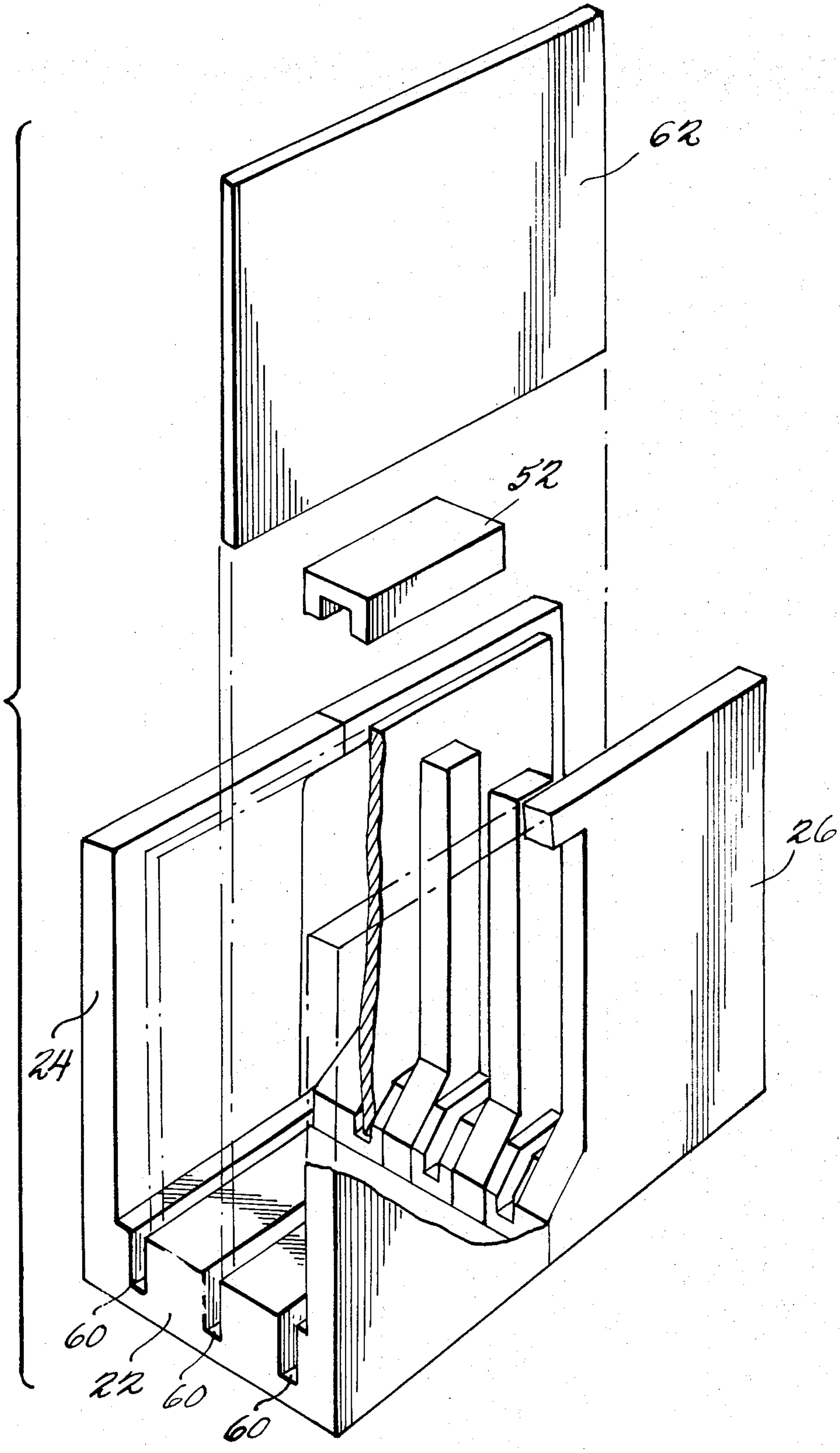
FIG. 9 shows a perspective view of a further modification according to this invention whereby the non-magnetic holder is slotted to receive shields for reducing cross-talk between adjacent heads and whereby back bars are placed between the upwardly extending legs of the core pieces to complete the magnetic circuit.

At this stage wire coils are preferably dropped onto the pole legs and back bars 52 bonded between each set of upwardly extending pole pieces as shown in FIG. 9. Further, according to another aspect of the novel method of this invention, the base portion 22 of ceramic block 20 was preferably grooved with grooves 60 before the titanium spots were vacuum deposited outside the pole pieces and the two halves put together. Suitable magnetic shields of any conventional material are then preferably placed in grooves 60, each shield separating adjacent pole pieces for reducing cross-talk between channels. The location of grooves 60 and a typical shield 62 can be seen in the exploded view of FIG. 9. The composite structure, either with shields as shown in FIG. 9 or without shields as shown in FIG. 8, is then potted in a suitable material and the front section of the head ground, lapped and polished as indicated in FIG. 9, exposing pole pieces and shields or simply pole pieces if shields are not employed. The shield material can be either a ceramic material having a high permeability or a metal having a high permeability. Many such shields are conventionally known and available.

Many changes and modifications in the above described technique can, of course, be made without departing from the scope of the invention. Accordingly that scope is intended to be limited only by the scope of the appended claims.

WHAT IS CLAIMED IS:

1. A method of making a multi-core magnetic head comprising the steps of:

producing a plurality of separated slots extending through the base portion of a block of non-magnetic ceramic material also having legs extending from the opposite ends of said base portion, placing a piece of magnetic ceramic material in each of said slots so that said pieces extend into a region bounded by the legs of said block, bonding each of said pieces of magnetic ceramic material to the non-magnetic material bounding the slot in which that piece has been placed, potting the region between said legs into which said pieces extend with potting material to provide mechanical strength, cutting said block and pieces bonded in the slots into two separate parts along a line passing through each of said pieces, removing material from the surfaces of each part formed by said cutting to profile the magnetic pieces to desired pole piece dimensions, and expose a gap surface for each pole piece, removing the potting material, depositing material on portions of said non-magnetic block adjacent said gap surfaces, and bonding the two parts together with gap surfaces from each part adjoining to form gaps and to form a multi-core head having pairs of pole legs extending upward from said non-magnetic block.

2. A method as in claim 1 including the further step of choosing said magnetic and non-magnetic materials to have similar mechanical properties.

3. A method as in claim 2 wherein said non-magnetic material is Zinc Ferrite and said magnetic material is Nickel Ferrite.

4. A method as in claim 1 including the further steps of producing grooves in said base portion between adjacent pieces and placing shield members in said grooves to reduce cross-talk.

5. A method as in claim 1 including the further steps of placing wire coils on said pole legs, placing a back bar between the pole legs of each pair to complete the magnetic circuit, potting the region between the legs of the non-magnetic block with potting material and removing sufficient potting material to expose the pole legs.

6. A method as in claim 1 wherein said step of bonding the magnetic ceramic material to the non-magnetic ceramic material includes the step of glass bonding.

7. A method as in claim 1 including the further step of grinding a quantity of magnetic ceramic material to a shape having a rough flat upper surface, a step surface, and a surface connecting said upper and step surfaces and inclined at an angle to said flat and step surfaces.

8. A method as in claim 1 including the further step of adding a further piece of ceramic material between the legs of said block of non-magnetic material and closing said region bounded by said legs of said block before said cutting and removing said further piece before said step of bonding the two parts together.

9. A method as in claim 1 including the further steps of hot pressing a ferrite ceramic to produce a block of said magnetic material, grinding said block of magnetic material and cutting said ground block to form said pieces.

10. A method as in claim 1 wherein said step of depositing includes the step of vacuum depositing titanium.

* * * * *